United States Patent [19]

Baumann

[11] Patent Number: 5,575,181
[45] Date of Patent: Nov. 19, 1996

[54] ONE-PIECE PEDAL

[75] Inventor: Hans-Uwe Baumann, Stuttgart, Germany

[73] Assignee: Dr. Ing. h.c.F. Porsche AG, Weissach, Germany

[21] Appl. No.: 456,461

[22] Filed: Jun. 1, 1995

[30] Foreign Application Priority Data

Nov. 26, 1994 [DE] Germany .................. 44 42 122.2

[51] Int. Cl.⁶ .................................................. G05G 1/14
[52] U.S. Cl. .................................... 74/512; 74/560
[58] Field of Search ........................ 74/512, 531, 560; 192/995; 29/411

[56] References Cited

U.S. PATENT DOCUMENTS

| 2,299,508 | 10/1942 | Skareen | 74/531 |
|---|---|---|---|
| 2,935,895 | 5/1960 | Krause | 74/531 |
| 3,744,340 | 7/1973 | Peterson | 74/560 |
| 4,598,457 | 7/1986 | Kiwak et al. | 29/411 |
| 4,846,012 | 7/1989 | Papenhagen et al. | 74/512 |
| 4,896,736 | 1/1990 | Smith | 74/512 X |
| 5,074,163 | 12/1991 | Baumann | 74/512 |
| 5,435,205 | 7/1995 | Seksaria et al. | 74/560 |

FOREIGN PATENT DOCUMENTS

| 2506971 | 12/1982 | France | 74/560 |
|---|---|---|---|
| 3427097 | 1/1986 | Germany | 74/560 |
| 3909941C2 | 9/1990 | Germany | 74/512 |
| 4235654 | 5/1993 | Germany | 74/560 |
| 4211640 | 10/1993 | Germany | 74/560 |

*Primary Examiner*—Vinh T. Luong
*Attorney, Agent, or Firm*—Evenson McKeown Edwards & Lenahan, PLLC

[57] ABSTRACT

One-piece pedal, such as a brake pedal or clutch pedal, which is produced in an injection molding process, and has two sections in the pedal body which are separated by way of a partition, the lower pedal section carrying the stepping plate being provided with reinforcing ribs in the longitudinal and transverse plane.

18 Claims, 2 Drawing Sheets

ONE-PIECE PEDAL

BACKGROUND AND SUMMARY OF THE INVENTION

This invention relates to a one-piece pedal for a motor vehicle comprising a pedal body which consists of a hollow profile and has a molded-on stepping plate as well as bearing bores and receiving devices, and which on the exterior side as well as on the interior side, has a largely smooth surface, and the stepping plate forms a frontal end wall for an open profile with a U-shaped cross-section of a lower section of the pedal body, which profile has interior reinforcing ribs.

From German Patent Document DE 39 09 941 C2, a pedal for a motor vehicle is shown which consists of a hollow profile, a stepping plate being molded to its pedal body, which stepping, plate reinforces the free end of the pedal section constructed as a U-profile. Another reinforcement in the form of a rib is also provided in this area.

It is an object of the invention to provide an improved pedal made of plastic or metal which, in the lower area of the pedal, ensures a stability which meets maximum stress conditions and nevertheless permits a manufacturing in an injection molding process with easily removable mold cores.

According to the invention, this object is achieved by means of an arrangement wherein the pedal body has at least two separate sections, one section carrying the stepping plate having first and second reinforcing ribs extending at least in a transverse plane, said first reinforcing rib which is directly adjacent to the stepping plate being arranged approximately in parallel to the second reinforcing rib, and wherein front and rear outer walls of the stepping plate extend at an acute angle with respect to the first and second ribs according to a mold core pulling direction to define respective wedge-shaped hollow spaces between said outer walls and said ribs, said ribs defining a space therebetween.

Principal advantages achieved by means of the invention are that, as a result of the special construction of the section of the pedal body carrying the stepping plate with several interior reinforcing ribs in the longitudinal and transverse planes, a design is achieved which is optimal with respect to the stability while the manufacturing is simple.

Thus, particularly the two reinforcing ribs in the transverse plane in an intimate connection with the further reinforcing ribs in the longitudinal plane contribute to a stable node which, for example, in the case of a brake pedal, absorbs sudden high stress, for example, in a vehicle crash, in which case the operating of the pedal can not only take place in a central manner but also from a diagonal direction, and a deformation or other damage is nevertheless prevented.

So that a simple core removal can take place after an injection molding, the hollow spaces formed by the reinforcing ribs are formed by the exterior walls, such as the rear wall and the frontal wall, in a wedge-shaped manner or with mold removal bevels, specifically in both planes, such as the longitudinal plane and the transverse plane of the pedal.

The reinforcing ribs in the transverse plane may extend into a partition of the hollow spaces, which separates the two sections of the pedal body from one another, as well as only into the frontal wall.

In the case of one pedal construction, for example, that of a brake pedal, the other reinforcing ribs extending in the longitudinal plane are each arranged between the rear wall and a first transversely extending reinforcing rib and between second transversely extending reinforcing ribs and the frontal wall. For achieving an optimal stiffness of the pedal, the reinforcing ribs extending in the longitudinal plane extend into the second section of the pedal body. For this purpose, this reinforcing rib extends from the interior side to the exterior side of the transversely extending reinforcing rib into the second section of the pedal body. The shape of this rib is designed such that it essentially rests against the curved transition from the first to the second pedal section. This reinforcing rib extends preferably in the longitudinal center plane of the pedal bodies.

According to a further development of the pedal, the exterior surface which otherwise has a smooth design may, for example, in the lower section of the pedal body be provided with an edge-side rib which is provided on the face of the leg of the U-shaped profile. At the same time, the upper section of the pedal body is provided on its rear side with a correspondingly constructed edge-side rib. These ribs are used essentially for reinforcing the edge and are used at the same time in the lower section as an enlarged supporting surface of the pedal on the floor.

The pedal may be produced from a plastic material but also from a metal.

Other objects, advantages and novel features of the present invention will become apparent from the following detailed description of the invention when considered in conjunction with the accompanying drawings.

DETAILED DESCRIPTION OF THE DRAWINGS

Figure 5:
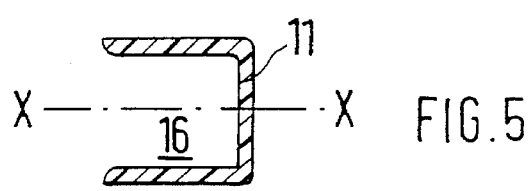
FIG. 5 is a sectional view taken along Line IV—IV of FIG. 1.
Figure 6:
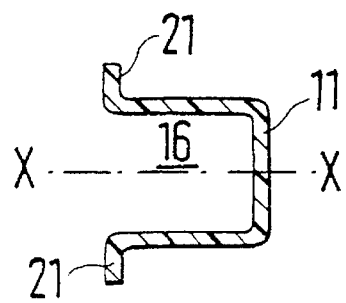
FIG. 6 is a sectional view of the arm of the pedal taken along Line VI—VI of FIG. 4.

A pedal 1, for example, for a brake or a clutch of a vehicle, consists essentially of a pedal body with a hollow cross-section, particularly of a rectangular cross-section and has a molded-on stepping plate 3 on the end-side of a lower section 2 and an arm 5 on the end-side of an upper section 4. The arm 5 is situated directly under a stop 25 fixed to the vehicle body and therefore, in the case of a crash, prevents the deep penetration of the pedal into the foot space. The lower section of the pedal body which carries the stepping plate 3 has a cross-section which is constructed as an open U-profile, in which case the arm 5 of the pedal body in section 4 is also formed by a corresponding U-profile, as illustrated in detail in FIGS. 5 and 6.

The two sections 2 and 4 of the pedal body may be separated by a partition 7. In the area of section 2, at least two reinforcing ribs 8 and 9 are provided which are arranged in transverse planes Y—Y and which extend approximately to the outer contour K of the pedal body. These two ribs 8 and 9 extend in parallel to one another, in which case the rear wall 10 is arranged with respect to the rib 8 at an acute angle of approximately 1°, and the frontal wall 11 is also arranged at approximately the same angle with respect to the rib 9 which, in this area, is formed by the stepping plate 3, so that a molding core can easily be removed. Because of this course of the opposite ribs and walls 8, 9 and 10, 11, one wedge-shaped hollow space 12, 13 respectively is formed between which a rectangular hollow space 16 is provided.

Figure 4:
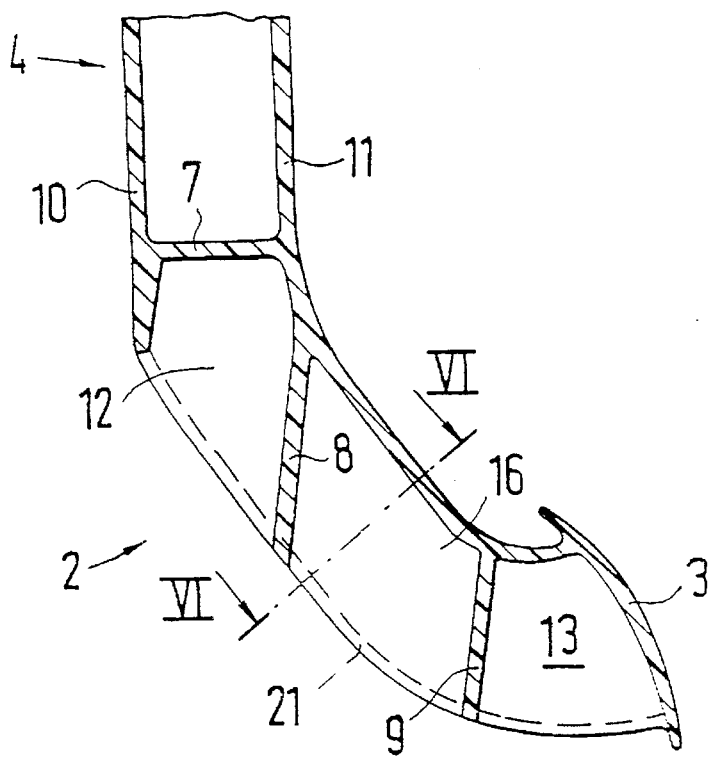
FIG. 4 is a view of another arrangement of the reinforcing ribs in a transverse plane.

According to another embodiment of FIG. 4, the two reinforcing ribs 8, 9 extend at an angle into the frontal wall 11 of the lower section 2 of the pedal body. The requirements of the parallelity of the two ribs 8 and 9 with respect to one another as well as the formation of wedge-shaped hollow spaces 12 and 13 are also met in the case of this construction. In this construction, the partition 7 may be eliminated.

Figure 1:
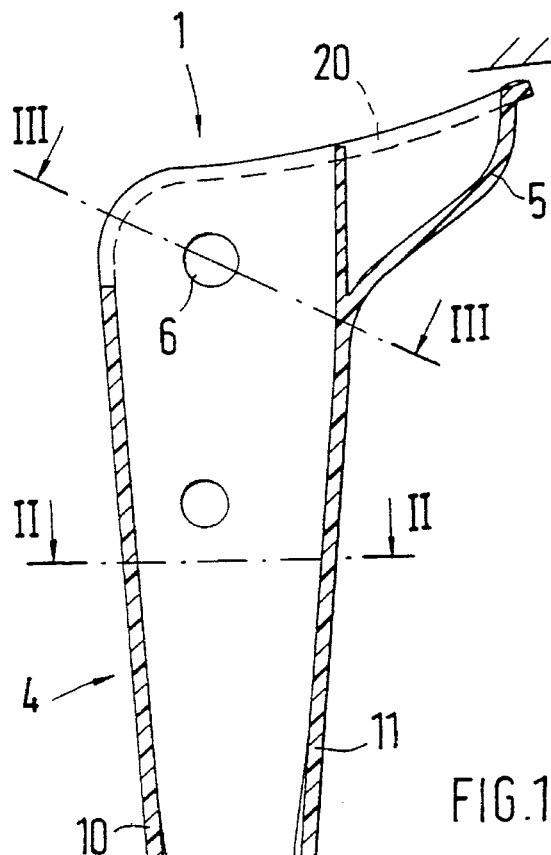
FIG. 1 is a longitudinal sectional view of a pedal, such as a clutch pedal or brake pedal and constructed according to a preferred embodiment of the invention.

According to another embodiment according to FIG. 1, the rear wall 10 extends adjacent to the rib 8 into the partition 7, the rib 9 extending into the frontal wall 11 and ending with it in the partition 7.

Figure 2:
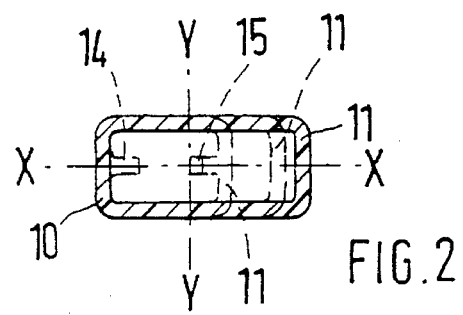
FIG. 2 is a cross-sectional view of the pedal taken along Line II—II of FIG. 1.

Supplementing the reinforcing ribs 8, 9 in the transverse plane Y—Y, additional reinforcing ribs 14, 15 may be provided in the longitudinal plane X—X, as indicated in detail concerning FIGS. 1 and 2. These ribs 14, 15 are each connected by way of a partial area a and b with the reinforcing ribs 8 and 9 of the transverse plane Y—Y and extend by way of the partition 7 into the section 4 of the pedal body, where they can end. This rib 15 also extends on the interior surface of the rib 9 in the hollow space 16. The above-mentioned course of the rib 15 on the interior side of the frontal wall 11 corresponds approximately to the curved contour V between section 2 and 4 of the pedal body.

Figure 3:
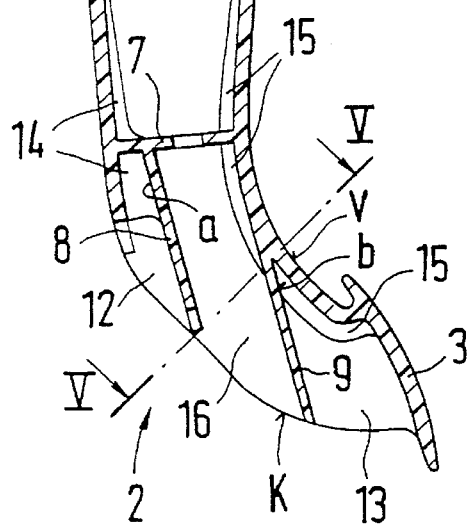
FIG. 3 is a sectional view taken along Line III—III of FIG. 1.
Figure 3:
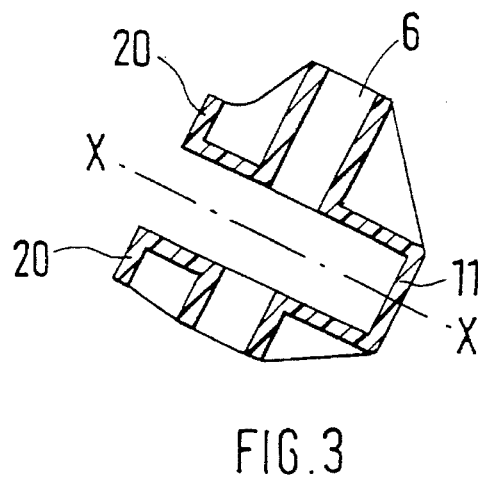

The pedal 1 may have a rib 20 either as an extension of the rear wall 10 on the arm 5 on the exterior side, as indicated in FIG. 3, or these ribs are provided in the lower section 2 as ribs 21. Ribs 20 and 21 may be molded to the pedal on the arm 5 as well as in section 2 of the pedal body.

In the frontal view, the pedal 1 has sections 2, 4 of the pedal body which are designed such that a mold core can easily be removed from these sections. For this purpose, these sections have exterior walls which extend in a wedge shape toward the partition 7.

Figure 7:
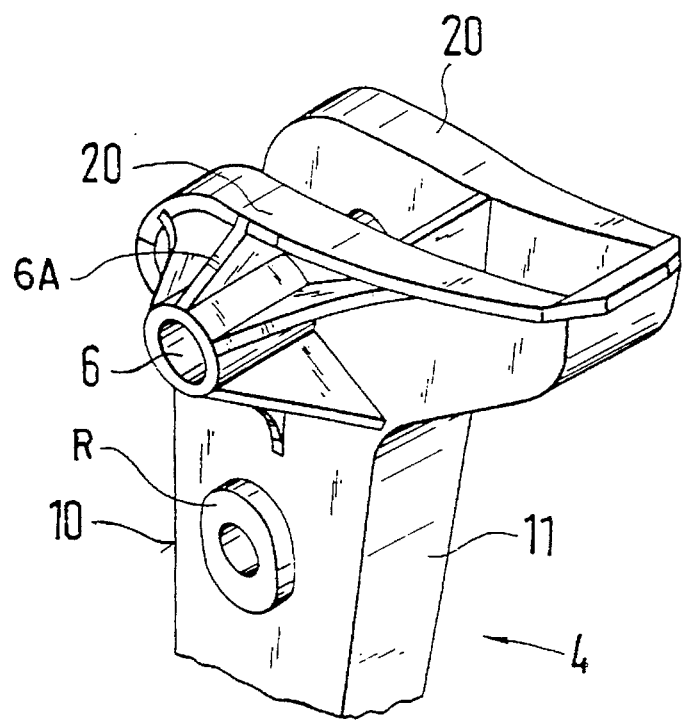
FIG. 7 is a diagrammatic representation of the arm with surrounding ribs and a molded-on bearing receiving device.

Bearing bushes 6, which produce a stiff connection with the pedal body by means of reinforcing ribs 6A, are molded to the exterior sides of the pedal body as best shown in FIG. 7. Receiving devices R are also molded on the pedal body.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A one-piece molded pedal for a motor vehicle comprising:

a first hollow closed profile section, and a second U-shaped profile section molded onto an end of said first hollow closed profile section, said U-shaped profile section having a stepping plate molded thereon, side walls of the U-shaped profile section extending as respective continuations of side walls of said first section, wherein first and second reinforcing ribs join the side walls of the U-shaped profile section with one another and extend toward the open side of said U-shaped profile section such that they form wedge shaped hollow spaces together with said side walls, said wedge shaped hollow spaces expanding toward said open side, whereby said reinforcing ribs reinforce said second section adjacent the stepping plate while accommodating molding of said second section, and wherein further reinforcing ribs are provided which join a bridge part of said U-shaped profile section at a position intermediate the side walls of the U-shaped profile section, said further reinforcing ribs protruding only partially into at least one of the wedge shaped hollow spaces.

2. Pedal according to claim 1, wherein the first and second profile sections are divided by an intermediate wall.

3. Pedal according to claim 2, wherein the intermediate wall extends from a rear outer wall of the pedal to the second reinforcing rib.

4. Pedal according to claim 2, wherein the first and second reinforcing ribs extend at an angle into a front outer wall of the pedal, and the hollow space situated between the reinforcing ribs has the front outer wall as its bottom.

5. Pedal according to claim 2, wherein the outside surfaces of the pedal, which otherwise have smooth surfaces, have edge-side ribs as an extension of the outside surfaces of a rear wall, which edge-sided ribs are provided in an area of the section carrying the stepping plate and/or in the area of an arm of the additional section as ribs.

6. Pedal according to claim 1, wherein the first and second reinforcing ribs extend at an angle into a front outer wall of the pedal, and the hollow space situated between the reinforcing ribs has the front outer wall as its bottom.

7. Pedal according to claim 6, wherein an intermediate wall of the pedal extends from a rear outer wall to the first reinforcing rib, wherein the second reinforcing rib and the rear outer wall and the intermediate wall enclose wedge-shaped hollow spaces, and wherein a substantially rectangular hollow space situated between the first and second reinforcing ribs has the intermediate wall as the bottom.

8. Pedal according to claim 7, wherein the further reinforcing ribs are arranged in a longitudinal plane between a rear outer wall and the second reinforcing rib as well as between the stepping plate and the first reinforcing rib.

9. Pedal according to claim 6, wherein the outside surfaces of the pedal, which otherwise have smooth surfaces, have edge-side ribs as an extension of the outside surfaces of a rear wall, which edge-sided ribs are provided in an area of the section carrying the stepping plate and/or in the area of an arm of the additional section as ribs.

10. Pedal according to claim 1, wherein an intermediate wall of the pedal extends from a rear outer wall to the first reinforcing rib, wherein the second reinforcing rib and the rear outer wall and the intermediate wall enclose wedge-shaped hollow spaces, and wherein a substantially rectangular hollow space situated between the first and second reinforcing ribs has the intermediate wall as the bottom.

11. Pedal according to claim 1, wherein the further reinforcing ribs are arranged in a longitudinal plane between a rear outer wall and the second reinforcing rib as well as between the stepping plate and the first reinforcing rib.

12. Pedal according to claim 11, wherein the further reinforcing ribs are connected by way of a partial area with the first and second reinforcing ribs in the longitudinal plane and these further reinforcing ribs extend by way of rib surfaces into the second section of the pedal and come to an end.

13. Pedal according to claim 11, wherein the further reinforcing ribs are arranged in a longitudinal plane on an interior side of a front outer wall and have a shape corresponding to a curved contour of the pedal between the two sections.

14. Pedal according to claim 1, wherein the outside surfaces of the pedal, which otherwise have smooth surfaces, have edge-side ribs as an extension of the outside surfaces of a rear wall, which edge-sided ribs are provided in an area of the section carrying the stepping plate and/or in the area of an arm of the additional section as ribs.

15. Pedal according to claim 14, wherein the edge-sided ribs are provided only in the area of the arm.

16. Pedal according to claim 1, wherein the pedal is made of plastic.

17. Pedal according to claim 1, wherein the pedal is made of metal.

18. Pedal according to claim 1, wherein said first and second reinforcing ribs are substantially parallel to one another to thereby define a substantially rectangular space therebetween.

* * * * *